May 6, 1958 L. A. KNOX 2,833,918
AMPLIFIER
Filed Jan. 30, 1953 3 Sheets-Sheet 1

INVENTOR
LEWIS A. KNOX
BY
Dewey J. Cunningham
ATTORNEY

May 6, 1958   L. A. KNOX   2,833,918
AMPLIFIER
Filed Jan. 30, 1953   3 Sheets-Sheet 3

INVENTOR
LEWIS A. KNOX
BY
Dewey J. Cunningham
ATTORNEY

United States Patent Office 2,833,918
Patented May 6, 1958

2,833,918

AMPLIFIER

Lewis A. Knox, Owego, N. Y., assignor to International Business Machines Corporation, New York, N. Y., a corporation of New York Application January 30, 1953, Serial No. 334,118

4 Claims. (Cl. 250—27)

The present invention relates to an improved amplifier.

An object of the invention is to provide an improved amplifier which may be utilized in servo systems for supplying a voltage of proper phase and magnitude to the electric motors thereof.

Most electric servo systems include a number of inductive devices having primary and secondary coils. When a primary coil is supplied with a voltage of a certain phase, the voltage induced in the secondary coil associated therewith is approximately 180° out of phase with the supply voltage. However, the secondary voltage is not precisely 180° out of phase. These servo systems also include a number of servomechanisms. A servomechanism is a power amplifying device in which the amplifying element driving the output motor is actuated by the difference between the input and the output. The aforementioned secondary voltage may be the input voltage supplied to the amplifying element so that the input to the amplifier is approximately 180° out of phase with the power supply. The output voltage from the amplifier may be supplied to the control winding of a two-phase output motor, the other winding of said motor being supplied with a reference voltage in quadrature with the control winding voltage. This output motor may be used to provide a shaft rotation input to a device which is to be positioned in accordance with the amplifier output. The motor also may be used to position the slider of a potentiometer which is supplied with a voltage from the power supply. The voltage on the slider is fed degeneratively to the input stage of the amplifier so as to buck out the input voltage supplied thereto. When the degenerative feed-back voltage approaches the input voltage in magnitude the motor approaches a stopped or null position. It will be seen, however, that the feed-back voltage will not be precisely 180° out of phase with the input voltage, since the input voltage was not precisely phase-shifted between the aforementioned primary and secondary coils. If the original amplifier input voltage from said inductive devices is broken down into a component precisely in-phase or 180° out-of-phase with the power supply and a quadrature-phase component, it is the in-phase or 180° out-of-phase component which is bucked out by the feed-back voltage. Thus, the quadrature-phase component of voltage remains.

Since the amplifier is sensitive to the amplitude of voltages applied to the control grid of its input stage, the aforementioned quadrature voltage is fed through the amplifier, causing saturation thereof in the later stages with a voltage having little or no effect on the output motor. This results in sluggish response by the motor and poor positioning of the potentiometer so that a poor null point results.

At the present time this undesirable quadrature-phase component of voltage is cancelled by the use of a quadrature rejector. The quadrature rejector includes a two-phase motor and a potentiometer, the slider of said potentiometer being positioned by said motor. This last mentioned motor is connected to receive the output from the amplifier and is supplied with a reference voltage which is in phase with the in-phase component of the amplified output. The in-phase component is that component of the output voltage used to drive the output motor. Thus, the only component of the supply voltage which drives the quadrature rejector motor is the undesired quadrature component of voltage input thereto. The quadrature rejector motor positions the slider on said potentiometer so that the output from said potentiometer is equal in magnitude and opposite in phase to said undesired quadrature component. The potentiometer output is then fed back to the amplifier so as to cancel the undesired component of quadrature voltage. This leaves only the in-phase component of voltage to feed the aforementioned output motor. Thus, the amplifier is not saturated in its later stages by the undesired component.

The present invention proposes to utilize an electronic means in the amplifier for cancelling the quadrature voltage. This is accomplished by use of a phase-sampling technique. The input stage to the amplifier includes a single stage amplifier and an inverter such that the output therefrom is in the form of two voltages 180° out of phase with each other. These voltages are supplied to the control electrodes of a pair of gate-controlled electron discharge means such as pentode vacuum tubes, connected in push-pull. The pentodes are rendered conducting by supplying to the suppressor grid thereof a sampling gate pulse for a short interval of time beginning just before and ending just after the undesired quadrature component of voltage passes through zero. The output from the pentodes is a signal of relatively short duration whose amplitude is substantially proportional to the magnitude of the in-phase component of voltage at its maximum value. These short duration signals or pulses are used to charge a capacitor. A restoring switch wave form generator allows the capacitor to stay in a charged condition over a period of time slightly less than one-half of a cycle of the power supply, at which time it then discharges the capacitor. The charge of the capacitor is used as the input voltage to another push-pull stage of the amplifier whose output is substantially an alternating square wave which is utilized to drive the output motor. Since the magnitude of the output voltage from the gate-controlled pentodes contains substantially none of the quadrature-phase component, the following amplifier stages will not be saturated and the motor can now accurately approach a null position.

Another object of the instant invention is to furnish an improved amplifier, and more particularly a servo amplifier for use in a servomechanism, wherein the amplifier output voltage is free of quadrature-phase component of voltage which may have been present in the input voltage to the amplifier.

Still another object of the invention is to provide an improved servo amplifier whose input voltage contains in-phase and quadrature-phase components of voltage, and whose output voltage has a magnitude substantially proportional to said in-phase component of voltage.

A further object of the invention is to provide an improved servo amplifier as described above, the output voltage of which alternates in polarity and is substantially square-wave in form.

A still further object of this invention is to furnish an improved servo amplifier for use in a servomechanism, said servo amplifier providing an output voltage such that accurate positioning of the servomechanism is obtained in approaching a null position.

Another object of the present invention is to utilize improved means for rejecting undesired quadrature-phase components of voltage fed to an amplifier.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference characters represent similar parts throughout the several views.

Figure 1:
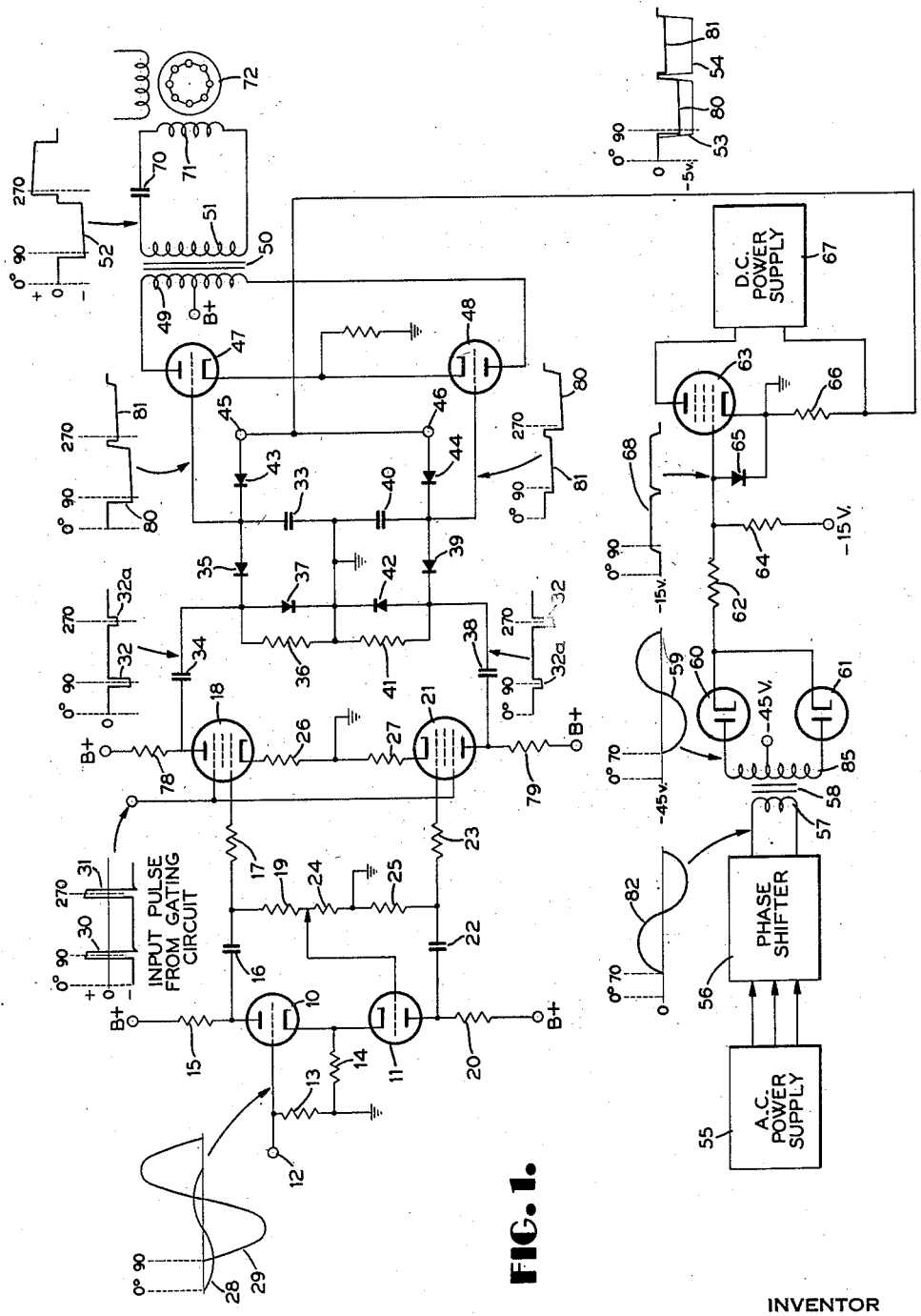
Fig. 1 is a schematic circuit diagram of the servo amplifier with illustrative voltage wave forms indicated at various points in the circuit.
Figure 2:
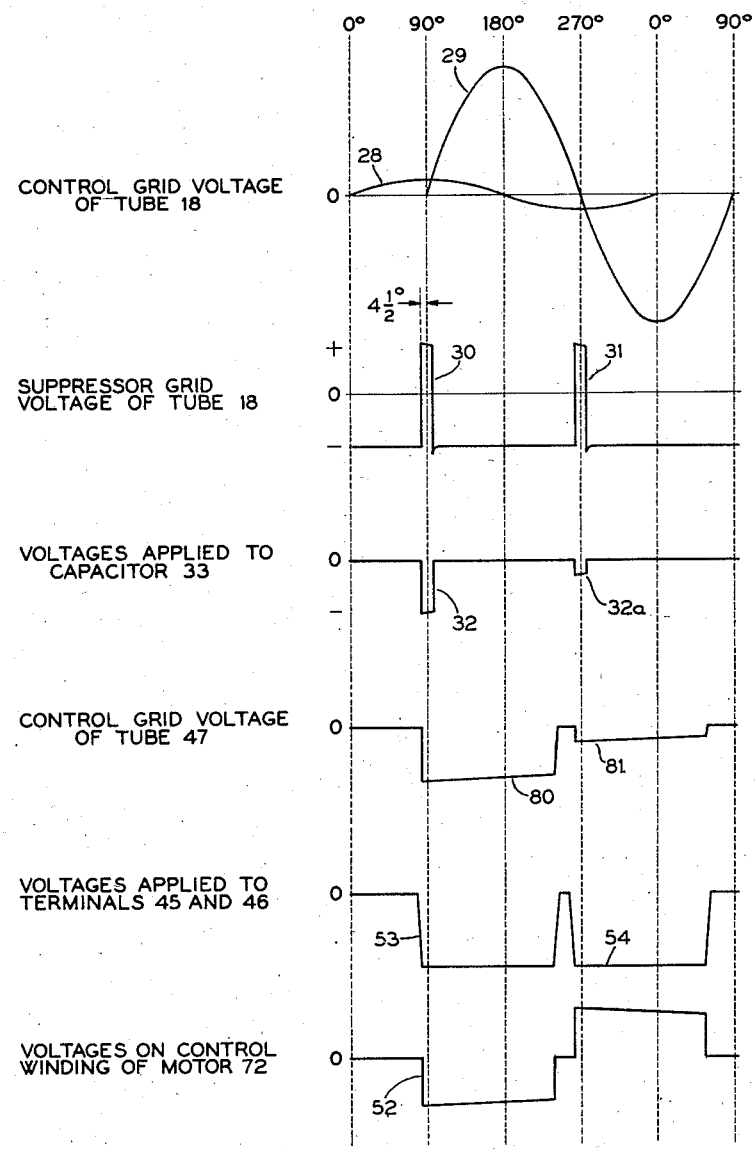
Fig. 2 is an enlarged view of a series of the wave forms shown in Fig. 1, said wave forms being plotted on identical time bases to illustrate the phase relationships therebetween.

Reference is made to the schematic diagram of Fig. 1, there being incorporated therein illustrative wave forms at various points in the circuit. Reference is also made to Fig. 2 wherein these illustrative wave forms are enlarged and related to each other in terms of degrees of phase displacement. The input stage of the amplifier includes a pair of vacuum triodes 10 and 11. The input voltage, which is sinusoidal in form with a frequency of preferably, but not necessarily, 400 C. P. S., is applied to terminal 12. This terminal is connected to the control grid of tube 10 and the voltage thereon is shown to comprise an in-phase component 28 which is quite small and a quadrature-phase component 29 which is quite large. This is the condition which results when the motor is approaching a stopped or null position. The in-phase component is used herein to mean a component whose phase is zero degrees or 180° relative to the power-supply phase of voltage. For example, the voltage illustrated by the wave form 28 is 180° out-of-phase with the power supply but is referred to as the in-phase component. This meaning, or definition, is used to distinguish these voltages from quadrature-phase voltages. The component breakdown of the input voltage is made for simplicity of explanation, it being understood that the actual input voltage is the sum of the in-phase and quadrature-phase components. Grid return resistor 13 and cathode biasing resistor 14 connect the grid and cathode, respectively, of tube 10 to ground. The plate of tube 10 is connected to a direct-current B+ voltage supply through plate resistor 15, while the plate output is fed through coupling capacitor 16 and current-limiting resistor 17 to the control grid of pentode 18. Resistors 19 and 24 form a voltage divider and are connected between the output side of capacitor 16 and ground. The plate output from tube 10 is connected to the control grid of tube 11 through capacitor 16 and resistors 19 and 24 so that tube 11 acts as an inverter to shift the phase of the input voltage by 180°. A direct-current B+ is supplied to the plate of tube 11 through resistor 20, the voltage on said plate being supplied to the control grid of pentode 21 through coupling capacitor 22 and current-limiting resistor 23. Resistors 19 and 24 serve as the grid return for tube 18 while resistor 25 serves as the grid return for tube 21.

Vacuum pentodes 18 and 21 are connected together to form a push-pull amplifier, the cathodes thereof being connected to a common ground through cathode resistors 26 and 27, respectively. The last named resistors are stabilizing resistors to equalize variations in the mutual conductance of the tubes. Direct-current voltages B+ are applied to the plates of tubes 18 and 21 through resistors 78 and 79, respectively. The input voltages to pentodes 18 and 21 will be of substantially the same wave form as the input to terminal 12 but of increased amplitude. However, the phase of the voltages will be displaced by 180°. That is, on the control grid of tube 18, the component of voltage illustrated by numeral 28, will be shifted 180° from the input to terminal 12. The quadrature component, illustrated by numeral 29, is also shifted 180° when it is applied to the control grid of tube 18. The input voltages to tube 21, however, will be of the same phase as voltages 28 and 29 at terminal 12, this action being caused by the inversion, in tube 11, of the output from tube 10.

The normal action of pentodes 18 and 21 would be to conduct so as to amplify the voltages applied to the control grids thereof. However, this would mean greater amplification of the undesired quadrature voltage. Therefore the tubes are operated so as to conduct only at predetermined intervals of time. Since the operation of tubes 18 and 21 are identical but in 180° phase relationship, only the operation of tube 18 will be explained in detail.

Figure 5:
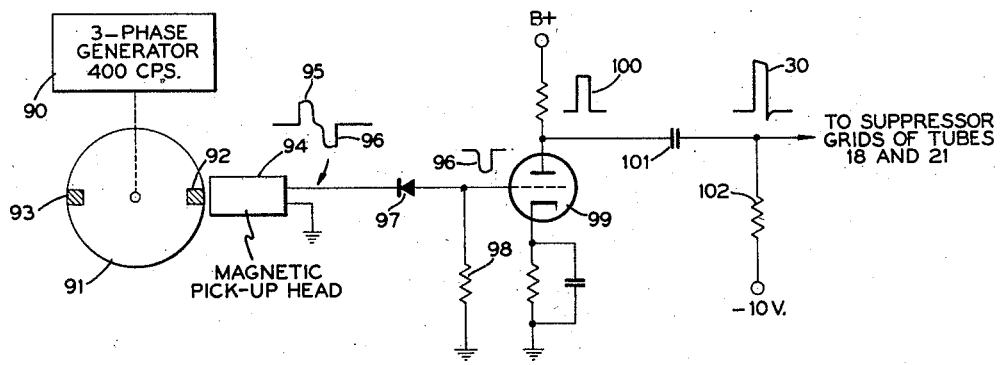
Fig. 5 is a schematic diagram of the gating circuit.

A conventional gating circuit, such as that shown in Fig. 5, is utilized to generate pulses illustrated by numerals 30 and 31, said pulses being applied to the suppressor grids of tubes 18 and 21. The pulses are generated in a conventional manner from the same alternating current 400 C. P. S. input from which the rest of the system operates. This three-phase generator is represented in Fig. 5 by reference numeral 90, the shaft output thereof driving commutator ring 91. Iron inserts 92 and 93 are provided in said ring in 180° spaced relation. Magnetic pick-up head 94 is arranged adjacent said ring so that when the iron inserts pass thereby the magnetic field of the pick-up head is changed, causing a voltage output therefrom. The time relationship between the generator and the iron inserts is such that the zero-phase voltage from the generator is at 90° when slug 92 is aligned with pick-up head 94. The pole pieces in the pick-up head are shaped to produce an output voltage similar to that illustrated by numerals 95 and 96 as each iron insert passes. This voltage is passed through rectifier 97 which leaves only the negative voltage 96, this voltage being applied across grid return resistor 98 to the control grid of triode 99. The output voltage is substantially a square pulse, as illustrated by numeral 100, and is applied through capacitor 101 and across resistor 102 to the suppressor grids of pentodes 18 and 21. Resistor 102 is connected to a —10 volt source so that the pentodes will be cut off between pulses.

It will be noted that the middle of pulse 30 is at the 90° mark while the middle of pulse 31 is at the 270° mark. The width of each pulse is approximately 1/40 of a cycle, or approximately 62.5 micro-seconds in width. In degrees, the pulses are approximately 9° in width so that the pulse begins 4½° before and ends 4½° after these marks. While this pulse width has been chosen as preferable other pulse widths may be used. The peak of these pulses is at approximately +10 volts, returning to —10 volts between pulses. Therefore, when they are applied to the suppressor grids of tubes 18 and 21 they cause the tubes to conduct during the brief interval of time when the pulses are at maximum potential.

Figure 3:
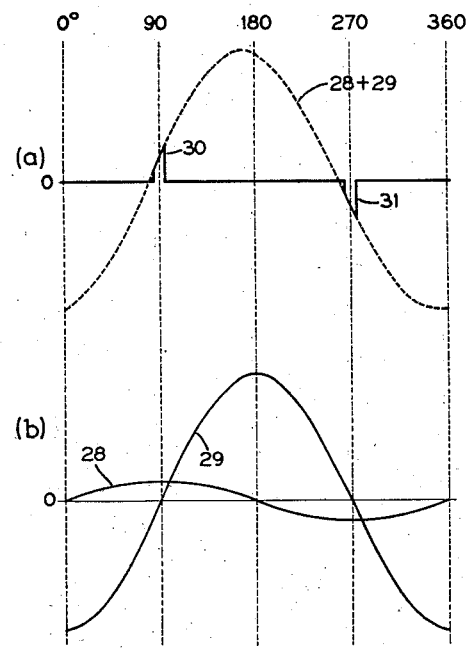
Fig. 3 is an enlarged view showing at (a) the amplifier input voltage as a resultant voltage with the gating pulse superposed thereon and at (b) said resultant voltage broken down into its in-phase and quadrature-phase components.

By reference to Fig. 3, wherein the in-phase and quadrature-phase components of voltage are shown enlarged, the pulses 30 and 31 are superimposed on the dotted outline of wave form 28+29 shown at (a), which is the sum of the in-phase and quadrature-phase components shown at (b), so that the tube is permitted to conduct for the time shown. Thus, only the portion of the waves represented by a solid line is passed through the pentodes. Since the in-phase component of voltage is at its maximum magnitude and the quadrature-phase component is passing through zero during the time the tube conducts, the output voltage on the plate of tube 18 will be of a magnitude substantially proportional to the magnitude of the in-phase component of voltage 28. The output voltage from the plate of tube 18 will be a negative pulse, similar to that shown in Fig. 1 illustrated by numeral 32, when voltage 28, as an input to tube 18, is positive in phase. However, when sampling takes place during the time when voltage 28, as an input to tube 18, is negative in phase, the characteristics of pentode 18 are such that a negative pulse of much less magnitude results, this pulse being illustrated by numeral 32a.

Pentodes 18 and 21 are operated class AB, which accounts for the difference in height between the output pulses. As the magnitude of the in-phase component of the input voltage decreases succeeding pulses 32 and 32a approach equality in amplitude.

Pulses 32 and 32a are used to charge capacitor 33 and are fed thereto through coupling capacitor 34 and rectifier 35. Capacitor 34 is connected to ground through resistor 36 so that when tube 18 stops conducting, capacitor 34 is restored.

Capacitor 33 cannot discharge through resistor 36 because of rectifier 35. That is, rectifier 35 has a high impedance to current flow from capacitor 33 through resistor 36 to ground as long as the capacitor charge is negative. Rectifier 37 is connected in parallel with resistor 36 between capacitor 34 and ground, so that there is a high impedance to current flow therethrough from capacitor 34 as long as the signal pulse is negative. The primary use of rectifier 37 is to prevent pulses 32 and 32a from going above the zero reference potential as they are returning to zero. As the positive going voltage begins to overshoot the zero reference voltage, any positive potential is shorted through rectifier 37, thereby suppressing it.

The plate output from tube 21 passes through coupling capacitor 38 and rectifier 39 to charge capacitor 40. Resistor 41 and rectifier 42 serve to connect capacitor 38 to ground and are identical to resistor 36 and rectifier 37, respectively. It will be noted that pulses 32 and 32a from tube 18 are 180° out-of-phase from pulses 32 and 32a from tube 21, this being due to a similar phase displacement in the inputs to the tubes.

Capacitors 33 and 40 are connected by rectifiers 43 and 44, respectively, to terminals 45 and 46, respectively. It will be apparent that as long as terminals 45 and 46 are kept at a negative potential lower than that on capacitors 33 and 40, these capacitors will remain charged. This is due to the fact that rectifiers 43 and 44 have a high impedance to current flow therethrough as long as terminals 45 and 46 are more negative than the charge on capacitors 33 and 40. The voltage on capacitor 33 is applied to the control grid of triode 47 while the voltage on capacitor 40 is applied to the control grid of triode 48. Therefore, negative pulses 32 and 32a are stretched to provide wave forms 80 and 81, respectively, which are fed to triodes 47 and 48.

Triodes 47 and 48 are connected as push-pull amplifiers and represent the final stage of the amplifier. The plates thereof are connected to opposite terminals of primary 49 of transformer 50, the output voltage from secondary 51, illustrated by reference numeral 52, being fed through capacitor 70 to winding 71 of two-phase motor 72. Capacitor 70 provides series tuning of the input voltage so that maximum power is delivered into the motor from the amplifier, this input voltage being the difference between the output voltages from triodes 47 and 48.

In order for the output voltages from tubes 47 and 48 to be useful, means is provided for discharging capacitors 33 and 40 at predetermined intervals of time. It will be noted that the charge on the capacitors on the side connected to terminals 45 and 46 is negative. As long as these terminals are maintained at a more negative potential than that on capacitors 33 and 40 the capacitors will not discharge. However, should the terminals return to zero potential, the capacitors will discharge. Therefore, a restoring switch circuit is provided for placing the terminals at a more negative potential than that on capacitors 33 and 40 for slightly less than one-half cycle, and then returning the potential to zero. The wave form of the potential applied to these terminals is illustrated by numeral 53. The wave begins to go negative a few degrees before the start of output signals 32 and 32a. This is to ensure that terminals 45 and 46 will be sufficiently negative at the time negative pulses 32 and 32a are applied to capacitors 33 and 40, respectively. Once the capacitors are charged they remain in this condition until wave 53 returns toward zero at which time the capacitors discharge. Wave 53 stays at zero voltage for an interval of time to permit relatively complete discharging of capacitors 33 and 40. The next wave, illustrated by numeral 54, begins approximately 180° after wave 53 so as to return terminals 45 and 46 to a sufficiently negative voltage to prevent the new charge applied to capacitors 33 and 40 from discharging immediately therethrough. As wave 54 returns to zero, however, the capacitors are permitted to discharge. Waves 80 and 81 have been superimposed on waves 53 and 54 in Fig. 1 to illustrate the relationship therebetween.

The means for generating wave forms 53 and 54 includes a three-phase 400 C. P. S. input voltage, illustrated by numeral 55, which is in synchronism with the system power supply. A phase shifter 56 is utilized to obtain a single-phase output voltage which lags the zero-phase of the input voltage by approximately 70°. This may be accomplished by conventional transformer means. That is, the input voltages may be applied to center-grounded Y-connected primary coils. From secondary coils associated with said primary coils, a voltage may be picked off of a desired phase and magnitude. A 70° lagging voltage output, illustrated by numeral 82, has been chosen in order that the potential represented by wave 53 will have time to decrease sufficiently ahead of negative pulses 32 and 32a so that capacitors 33 and 40 will not be discharged until desired.

From phase shifter 56 the output voltage is applied to primary 57 of transformer 58, the secondary 85 of which is center-tapped and biased by a direct-current voltage of approximately —45 volts. Therefore, the voltage appearing at each terminal of the secondary is a sine wave having —45 volts as a reference voltage, said sine wave being illustrated by numeral 59 in Fig. 1. Diodes 60 and 61 are connected to opposite terminals of the transformer secondary, the output voltages from said diodes being combined to form a full-wave rectifier. This rectifier is connected through resistor 62 to the control grid of pentode 63, said control grid being biased through resistor 64 to a direct-current voltage of —15 volts. A rectifier 65 is connected between said control grid and ground potential. The cathode of tube 63 is connected directly to ground potential and terminals 45 and 46 are connected through resistor 66 to ground potential. A direct-current floating power supply, illustrated by numeral 67, is connected to apply 150 volts between the plate of pentode 63 and the ungrounded side of resistor 66.

Figure 4:
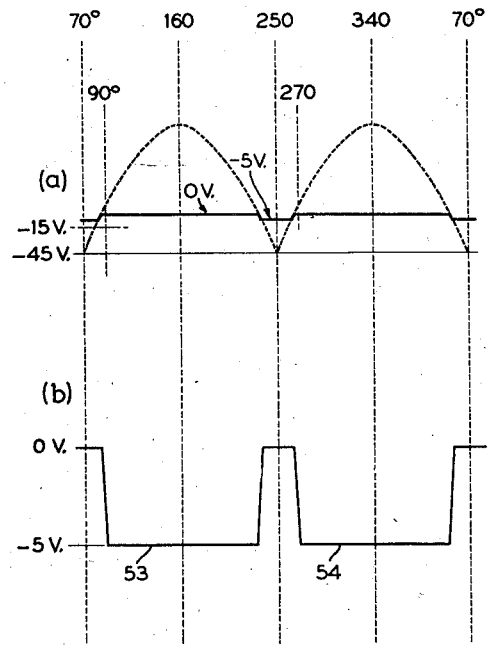
Fig. 4 shows a wave form at (a) with various voltage levels indicated thereon, the used portions of said wave form shown in a solid line being inverted and amplified and shown at (b) as the voltage to control the capacitors which supply voltage inputs to the final stage of the amplifier.

The operation of this restoring-switch wave form generator will now be described and for this purpose attention is directed to Figs. 1 and 4. It will be seen that there is approximately a 30 volt bias across diodes 60 and 61 so that these tubes will not conduct until the sine wave input, as shown by numeral 59, reaches —15 volts. At this time conduction begins and continues until sine wave 59 goes more negative than —15 volts. However, as soon as the voltage reaches zero, any increase in voltage is grounded through rectifier 65, since this rectifier has minimum impedance to current flow when the anode is positive with respect to the cathode.

The result is that the peaks of the input waves are cut off at zero so that the output voltage has a wave form approximately that illustrated by numeral 68. The wave begins at −15 volts and incerases to zero, continues at zero for a predetermined period of time, and returns to −15 volts for a shorter predetermined period of time.

Pentode 63 has such charactistics that it does not conduct until the grid voltage reaches approximately −5 volts. When wave 68 reaches −5 volts the tube begins to conduct and continues to do so until the wave returns to −5 volts, thus causing a voltage drop across resistor 66. Therefore, the voltage applied to terminals 45 and 46 is that illustrated by numerals 53 and 54 in Fig. 1. This is the same voltage which is shown in solid line in Fig. 4. Voltage 53 does not being to decrease at the identical time the 70° lagging voltage 59 begins to increase because votlage 53 is developed after voltage 59 begins. However, the voltage does begin its negative swing in time to assure that terminals 45 and 46 are sufficiently negative, when pulses 32 and 32a are applied to capacitors 33 and 40, respectively, to prevent discharging of the capacitors. For the purpose of illustration, the charges on capacitors 33 and 40 have been superimposed on wave form 53 and 54 in Fig. 1.

From the above-detailed explanation of the structure and operation of the present invention, it will be seen that the voltage which is supplied from the amplifier to the control winding of the output motor has a magnitude proportional to the maximum magnitude of the in-phase component of voltage supplied to the amplifier. The quadrature-phase component of the amplifier input voltage does not appear in the amplifier output thereby obviating the necessity of a quadrature rejector unit. Since the later stages of the amplifier are no longer saturated by the undesirable quadrature-phase component of voltage, the amplifier supplies accurate voltages to the output motor. As the motor drives the slider of a potentiometer (not shown) for feeding back to terminal 12 a voltage 180° out-of-phase with the component represented by numeral 28, this last mentioned component is gradually bucked out. Since the control winding of the output motor receives only the amplified sum of these voltages the output motor is very sensitive in approching its null position.

The servo amplifier which is the subject of this invention has distinct advantages over the prior art use of an amplifier provided with a quadrature rejector unit. A particular advantage is that the present invention has less weight, thus making it well adapted for use in aircraft where weight is at a premium. The response time is much less than conventional apparatus thereby increasing the servo system sensitivity. There is also a considerable saving in cost since the quadrature rejector unit requires small precision gears.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an amplifier having a voltage input which includes a desirable phase component of voltage and a phase component in quadrature therewith, said amplifier comprising a gate-controlled electron discharge device including a control electrode and a gating electrode, said input voltage being applied to said control electrode, a gating circuit connected to said gating electrode for generating a gating pulse of relatively short duration, said pulse being generated at a time when said quadrature-phase component of voltage is of substantially minimum amplitude, said gating pulse causing said gate-controlled device to conduct during the time said pulse is generated, capacitor means connected to said gate-controlled device to receive the output voltage therefrom, a discharge path for said capacitor means, and a switching circuit connected to said capacitor means for controlling the discharging thereof through said discharge path, said capacitor means being charged during one gating time of said tube and discharged immediately before the next gating time.

2. In an amplifier having a voltage input which includes a desirable phase component of voltage and a phase component in quadrature therewith, said amplifier comprising a gate-controlled electron discharge device including a control electrode and a gating electrode, a gating circuit for generating a gating pulse of relatively short duration at the time when said quadrature-phase component of voltage is a minimum, said gating circuit being connected to said gating electrode for supplying said gating pulse thereto, a capacitor connected to said gate-controlled device to receive the output voltage therefrom, a discharge path for said capacitor, and switching means connected to said discharge path for controlling the discharge of said capacitor at predetermined time intervals, said switching means supplying a voltage to said discharge path which begins before one pulse of the output voltage is applied to said capacitor to prevent said capacitor from discharging and ends before the next pulse of the output voltage occurs so as to discharge said capacitor.

3. In an amplifier having a voltage input which includes a desirable phase component of voltage and a phase component in quadrature therewith, said amplifier comprising a gate-controlled electron discharge device including a control electrode and a gating electrode, a gating circuit connected to said gating electrode, said gating circuit generating a gating pulse of relatively short duration during the time said quadrature phase component of voltage on said control electrode is of substantially minimum amplitude, the output voltage from said gate-controlled device having a magnitude dependent on the magnitude and polarity of said input voltage during the time said gating pulse occurs, a capacitor connected to said gate-controlled device to receive the output signal voltage therefrom, and means connected to said capacitor for controlling the discharging thereof at predetermined intervals of time, the last-named means including a discharge point, rectifier means connecting said capacitor and said discharge point, a wave form generator connected to said rectifier means and said discharge point, said wave form generator supplying an output voltage to said rectifier which begins before one signal is applied from said gate-controlled device to said capacitor to prevent said capacitor from discharging through said discharge path, and ends before the next signal from said gate-controlled device is applied to said capacitor to permit said capacitor to discharge.

4. An amplifier having a voltage input which includes an undesirable quadrature-phase component of voltage, said amplifier comprising a pair of gate-controlled electron discharge means connected in push-pull, each of said gate-controlled means including a control electrode, a gating electrode and an anode, said input voltage being applied to the control electrode of one of said gate-controlled means 180° out-of-phase with the input voltage applied to the control electrode of the other gate-controlled means, gating pulse generator means connected to the gating electrodes of said gate-controlled means for supplying a gating pulse of relatively short duration thereto during the time said quadrature-phase component of voltage is of minimum magnitude, capacitor means connected to the anode of each of said gate-controlled means, each of said capacitor means being charged by the output voltages from the gate-controlled means connected thereto, and discharge means connected to said capacitor means for controlling the length of time said capacitor means remain in a charged condition, said discharge means being operative to discharge each of said capacitor means to a predetermined condition immediately before each gating pulse.

References Cited in the file of this patent

UNITED STATES PATENTS

| | | |
|---|---|---|
| 2,399,695 | Satterlee | May 7, 1946 |
| 2,441,175 | White et al. | May 11, 1948 |
| 2,458,599 | Hussey | Jan. 11, 1949 |
| 2,459,117 | Oliver | Jan. 11, 1949 |
| 2,482,549 | Killman et al. | Sept. 20, 1949 |
| 2,515,249 | McCoy | July 18, 1950 |
| 2,554,987 | Hogle | May 29, 1951 |
| 2,625,662 | Gaynor et al. | Jan. 13, 1953 |